(12) United States Patent
Chen (10) Patent No.: US 9,938,697 B1
(45) Date of Patent: Apr. 10, 2018

(54) WATER GENERATION SYSTEM FOR IMPROVEMENT OF WATER SHORTAGE ENVIROMENT

(71) Applicant: Jui-Wen Chen, New Taipei (TW)

(72) Inventor: Jui-Wen Chen, New Taipei (TW)

(*) Notice: Subject to any disclaimer, the term of this patent is extended or adjusted under 35 U.S.C. 154(b) by 0 days.

(21) Appl. No.: 15/396,823

(22) Filed: Jan. 3, 2017

(30) Foreign Application Priority Data

Sep. 19, 2016 (CN) .......................... 2016 1 0829595

(51) Int. Cl.
*E03B 3/28* (2006.01)

(52) U.S. Cl.
CPC ...................... *E03B 3/28* (2013.01)

(58) Field of Classification Search
CPC ................. E01C 11/226; E03B 3/28
See application file for complete search history.

(56) References Cited

U.S. PATENT DOCUMENTS

| | | | | | |
|---|---|---|---|---|---|
| 5,788,407 | A * | 8/1998 | Hwang | ................... | C04B 28/02 404/31 |
| 6,585,449 | B2 * | 7/2003 | Chen | ....................... | E01C 11/18 404/2 |
| 7,351,004 | B2 * | 4/2008 | Shaw | .................... | E01C 11/226 404/17 |
| 8,142,101 | B2 * | 3/2012 | Kaul | ....................... | E01C 7/085 404/31 |
| 8,267,618 | B2 * | 9/2012 | Chen | ....................... | E01C 3/003 404/17 |
| 8,388,260 | B2 * | 3/2013 | Chen | ....................... | E01C 3/00 404/17 |
| 8,740,496 | B2 * | 6/2014 | Allen | ...................... | E01C 11/18 403/364 |
| 9,303,365 | B2 * | 4/2016 | Gooden | ............. | A01G 13/0237 |
| 2010/0272514 | A1 * | 10/2010 | Hart | .......................... | E01C 3/06 405/55 |
| 2011/0174706 | A1 * | 7/2011 | Russell | .................. | A01G 25/00 210/170.01 |
| 2011/0233121 | A1 * | 9/2011 | Liu | ........................ | E03F 5/0404 210/165 |
| 2012/0329934 | A1 * | 12/2012 | Bower | .................... | C03C 12/00 524/425 |

FOREIGN PATENT DOCUMENTS

JP         2006022502  A  *  1/2006

* cited by examiner

*Primary Examiner* — Benjamin F Fiorello
(74) *Attorney, Agent, or Firm* — Leong C. Lei (57) ABSTRACT

A water generation system for improvement of water shortage environments is provided as a water generation system that is constructed as a surface pavement in a water shortage area and generally includes a sand layer, which is covered with a moisture locking cloth, a grading layer laid on the moisture locking cloth, and a water pervious layer arranged on the grading layer. The water pervious layer includes a plurality of hollow water penetration tubes vertically arranged above the grading layer. The water penetration tubes each have a tubular wall in which through apertures are formed. The water penetration tube has an outer circumference over which a tubular sleeve having an opening facing downward is fit such that an interlayer space is formed between the tubular sleeve and the tubular wall of the water penetration tube.

12 Claims, 7 Drawing Sheets

WATER GENERATION SYSTEM FOR IMPROVEMENT OF WATER SHORTAGE ENVIROMENT

(a) TECHNICAL FIELD OF THE INVENTION

The present invention relates to a water pervious pavement structure that is constructed on ground surface and also functions as an automatic water generation system, and more particular to a water generation system for improvement of water shortage environments that allows surface air to be automatically driven into the underground for water condensation for forming condensed water that is accumulated and stored for subsequent uses, and is particularly applicable to a tropic desert climate area where a significant temperature difference exists between daytime and nighttime and only very few rainfall is present.

(b) DESCRIPTION OF THE PRIOR ART

The Earth has a surface of which 71% is covered by water. However, only 2.5% of the total amount of water is fresh water and the amount of fresh water that is conveniently accessible and is widely used by human beings is less than 1%. With the development of industry and the significant increase of human population, the demand of human being for fresh water is greatly increased. This, together with the damage to the ecology and pollution of the environment, makes water resources protection a vital global issue. Different areas of the world are facing different issues and problems for protection and preservation of water resources. In many areas of the world, the demand for water resources has already exceeded the supply of water that they can access. And, thus, emphasis must be placed in treasuring water resources available in lands. For example, in tropic desert areas, where annular rainfall or precipitation may be extremely small or even no rainfall at all for years, sun light is intense in daytime, which leads to an extremely high temperature, low humidity, and even strong winds and a great difference of temperature between daytime and nighttime in such areas often leads to fast evaporation of water contained in soil, making such areas constantly in a water deficient condition. This makes the development of water resources very important.

In view of the above, the present invention aims to provide a water generation system for improvement of water shortage environments, which makes use of the weather characteristic of exhibiting a great temperature difference between daytime and nighttime to achieve automatic generation of water without any consumption of energy and also to accumulate and store such water for subsequent uses.

SUMMARY OF THE INVENTION

Thus, the primary object of the present invention is to provides a water generation system for improvement of water shortage environments, which allows rainwater to quickly penetrate downward for accumulation and storage and allows cold air during the nighttime when atmosphere temperature is relatively low to be conducted into an interlayer space formed in an underground water pervious layer for condensation of water so as to provide an effect of water generation without consuming electrical power, wherein a moisture locking cloth may be laid in the ground layers to allow the condensed water that moves downward and passes through the moisture locking cloth to be preserved in the ground layer in which the moisture locking cloth is provided for subsequent uses.

Another object of the present invention is to provide a water generation system for improvement of water shortage environments, which conducts, during a daytime when the atmosphere temperature is relatively high, hot air into an interlayer space formed in an underground water pervious layer to interact with a relative low underground temperature for inducing an effect of condensation so as to achieve an effect of generating condensed water without consuming electrical power, wherein a moisture locking cloth may be laid in the ground layers to allow the condensed water that moves downward and passes through the moisture locking cloth to be preserved in the ground layer in which the moisture locking cloth is provided for subsequent uses.

A further object of the present invention is to provide a water generation system for improvement of water shortage environments, which comprises a water tank embedded in the ground so that condensed water formed according to the present invention is allowed to penetrate down into the water tank for accumulation and storage for subsequent uses.

To achieve the above objects, construction is made with an artificial surface pavement, which comprises a laid layer used in combination with a water pervious layer, laid from bottom to top. The laid layer comprises a sand layer and a grading layer. The laid layer is solely formed of a sand layer in combination with the water pervious layer, or alternatively, the laid layer is solely formed of a grading layer in combination with the water pervious layer, or alternatively, the laid layer is formed of both a sand layer a the grading layer, in combination with a water pervious layer, which are laid sequentially from bottom to top.

In such a construction, a water tank is selectively embedded, in advance, under the sand layer or the grading layer. The water tank is provided thereon with a plurality of through holes. A sand blocking member, such as a nonwoven fabric material, is laid on and covers each of the through holes. A moisture locking cloth is provided under the water pervious layer to provide an effect of preventing evaporation and escape of water so as to keep ground layers wet. The moisture locking cloth may be provided on the sand layer or alternatively, the moisture locking cloth is provided on the grading layer. The water pervious layer comprises a plurality of hollow water penetration tubes that are vertically arranged and distributed above the grading layer. The water penetration tubes each have a tubular wall in which a plurality of through apertures is formed. The water penetration tube has an outer circumference over which a tubular sleeve having an opening facing downward is fit to form an interlayer space between the sleeve and the tubular wall of the water penetration tube. A bottom of the water penetration tubes and a bottom of the sleeve are both in an open form. Cement is grouted around circumferences of the plurality of sleeves to form a water pervious layer exhibiting an effect of water drainage. As such, when rain falls on the surface, the water penetration tubes allow the rainwater to quickly penetrate into the underground to be accumulated and stored in the underground water tank for subsequent uses. Further, a temperature difference between daytime and nighttime is used such that the cold air of the nighttime is conducted through the water penetration tubes into the interlayer space to get condensed, through an effect of condensation, onto water on the tubular walls thereby achieving an effect of automatic water generation through condensation. Further, the water formed through condensation is allowed to penetrate down into the underground the water tank for accumulation and storage for subsequent uses.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
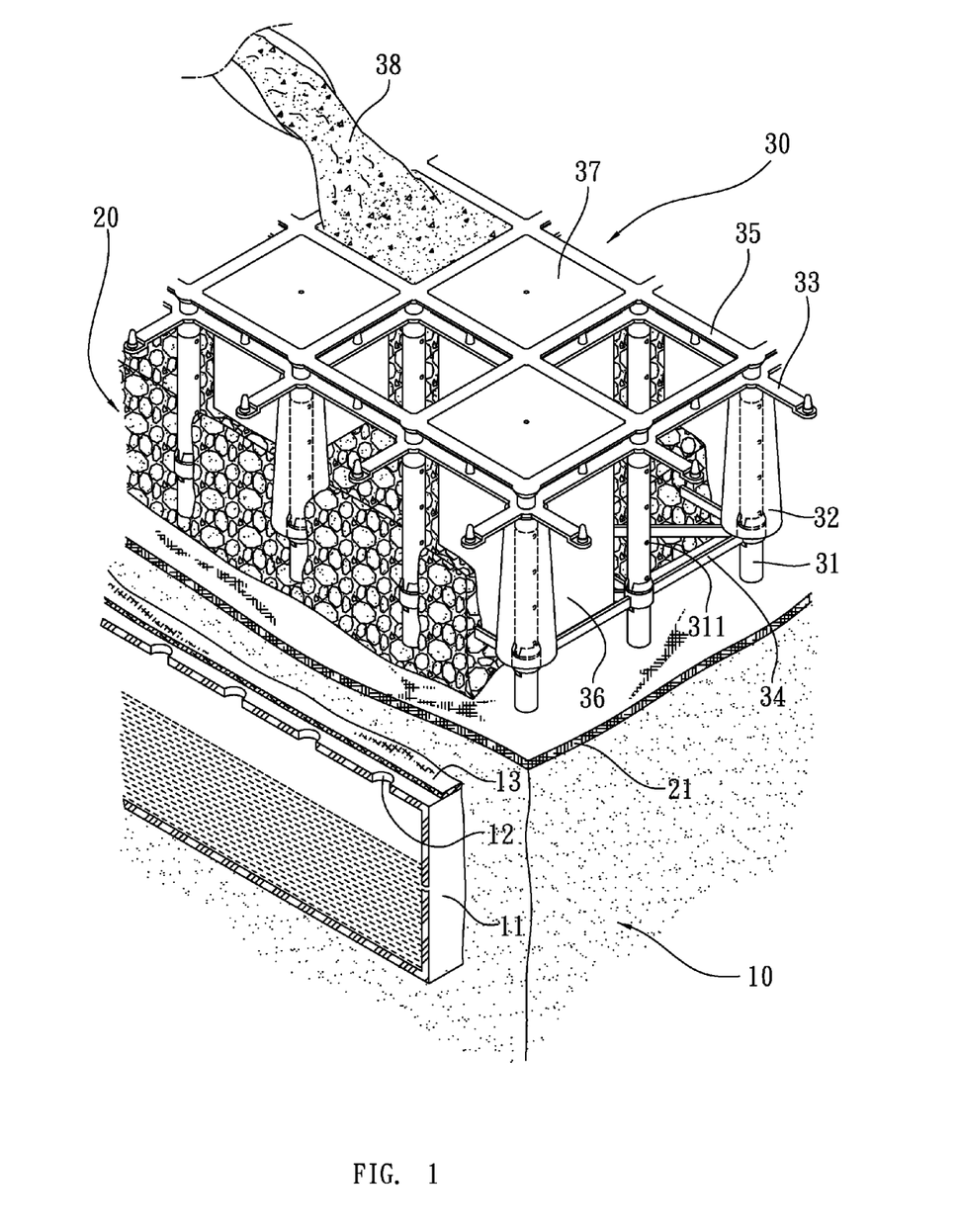
FIG. 1 is a perspective view showing a water pervious pavement structure according to the present invention.
Figure 2:
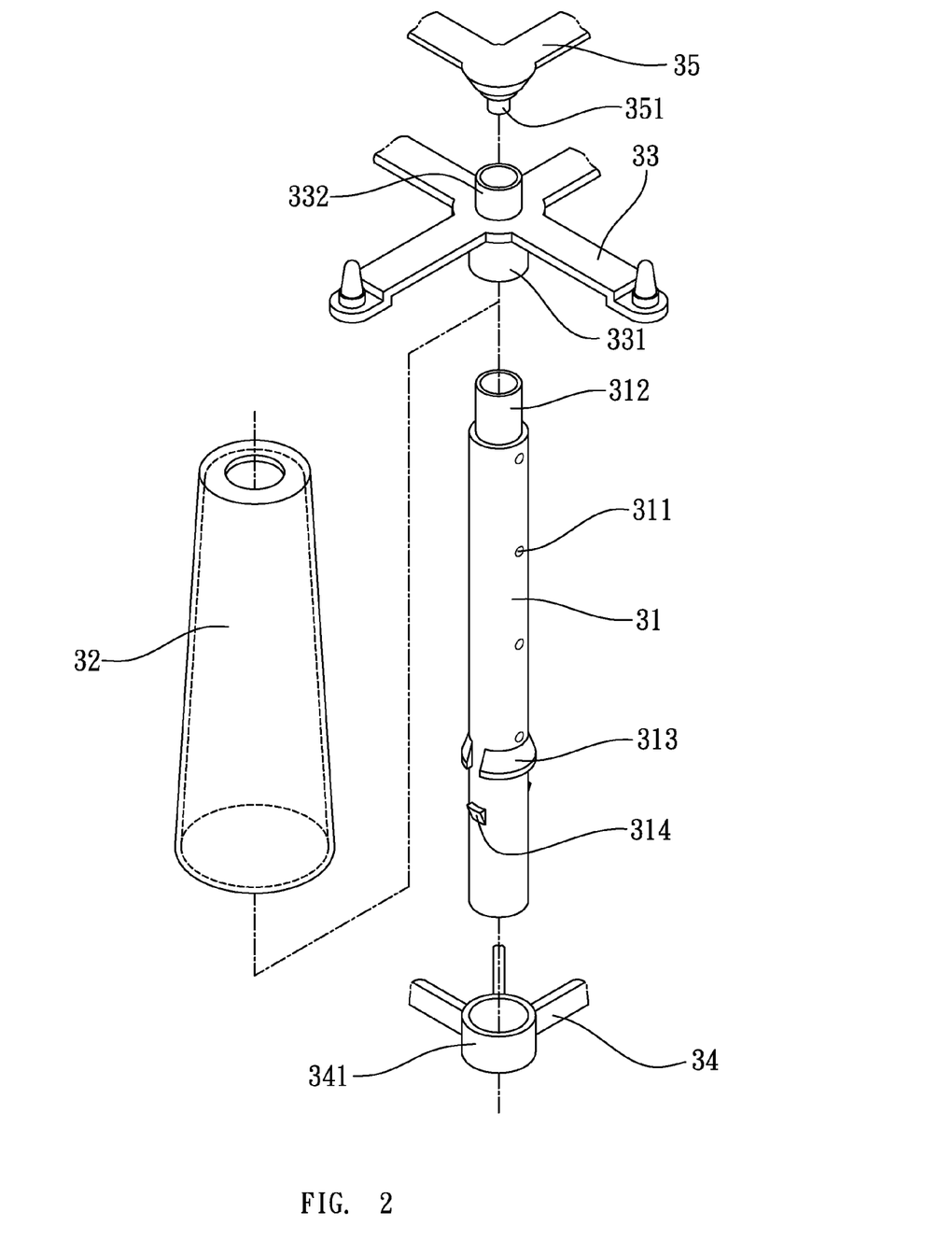
FIG. 2 is an exploded view showing a frame structure of the water pervious layer according to the present invention.
Figure 3:
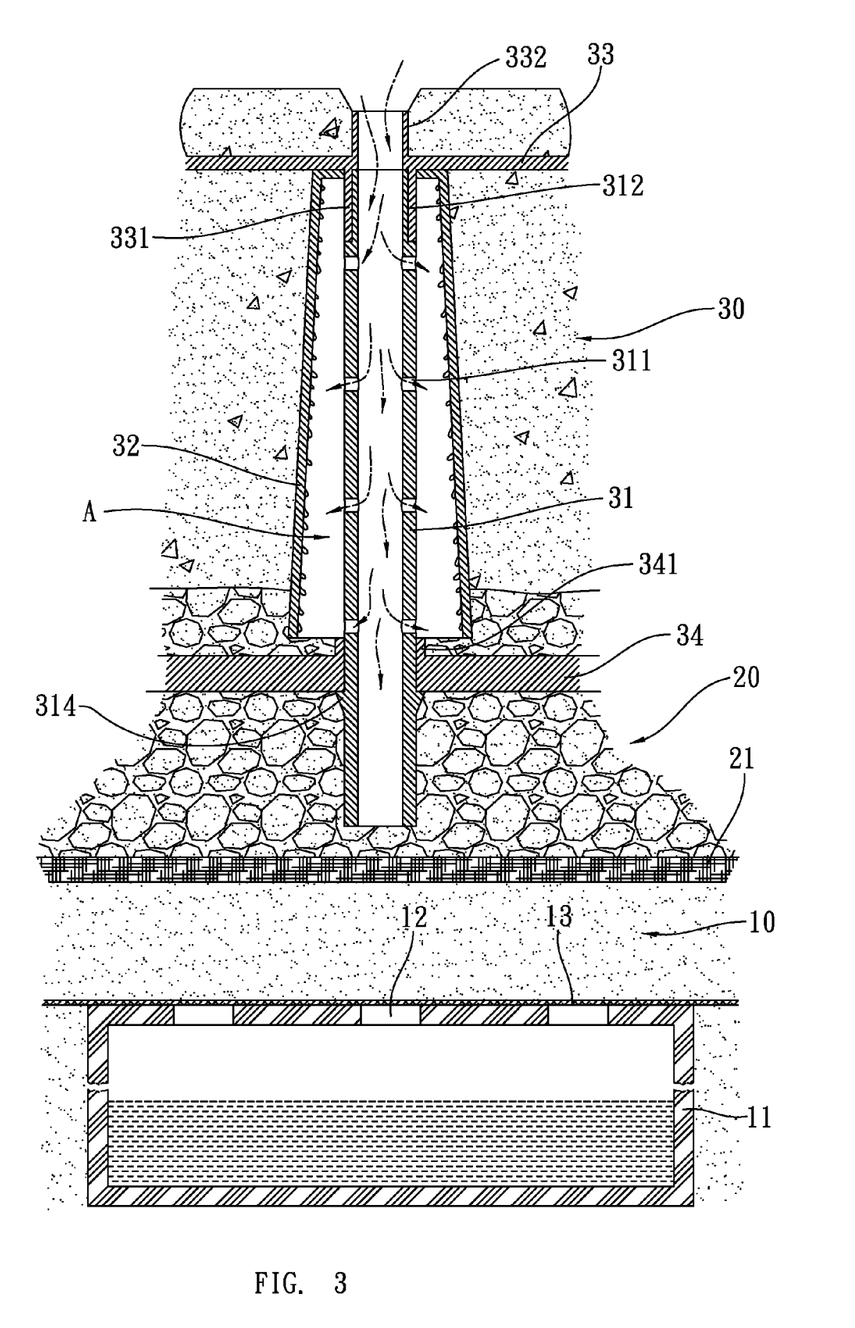
FIG. 3 is a cross-sectional view of the water pervious pavement structure according to the present invention.

Referring to FIGS. 1-3, the present invention provides a water generation system for improvement of water shortage environments, which is formed of laid layers, in combination with a water pervious layer, laid from bottom to top and including a water pervious pavement structure constructed on surface. In the embodiment illustrated in the drawings, the system comprises, from bottom to top, laid layers that include a sand layer 10 and a grading layer 20, in combination with a water pervious layer 30.

The sand layer 10 may comprises a water tank 11 that is embedded therein during laying. The water tank 11 is provided, in a top thereof, with a plurality of through holes 12, and a sand blocking member, such as a piece of non-woven fabric 13, is arranged atop and covers each of the through holes 12 in order to block sands and allow rainwater or condensed water to penetrate into the underside water tank 11 for accumulation and storage for subsequent uses.

The grading layer 20 and the sand layer 10 are provided with a moisture locking cloth 21 interposed therebetween. The moisture locking cloth 21 provides an effect of preventing reverse flow of moisture so that when moisture or water flows down into the sand layer 10 under the moisture locking cloth 21, the moisture or water is prevented from evaporating and escaping upward. The grading layer 20 can be formed of local soil or earth or grading material for general road construction including sand or soil, or gravel, which may additionally mixed with water pervious concrete, or may be mixed with other grade materials that are not harmful to the environments and may serve as pavement, subjected to proper compacting.

The water pervious layer 30 comprises a water pervious pavement structure, which comprises a plurality of hollow water penetration tubes 31 arranged vertically and set above the grading layer 20. The water penetration tubes 31 each have a tubular wall in which a plurality of through apertures 311 is formed. The water penetration tubes 31 has an outer circumference over which a tubular sleeve 32 that has an opening facing downward is fit such that the sleeve 32 and the tubular wall of the water penetration tube 31 define and delimit therebetween an interlayer space A. A bottom of the water penetration tube 31 and a bottom of the sleeve 32 are both made in an open form and in a preferred embodiment, the bottom of the water penetration tube 31 and the bottom of the sleeve 32 are both embedded in the grading layer 20. Concrete grouting is then conducted to construct the water pervious layer 30 that shows an effect of water drainage.

Further, in the instant preferred embodiment, the water penetration tubes 31 and the sleeves 32 are combined together with an upper connection sub-frame 33 and a lower connection sub-frame 34 to form a frame structure that is laid and arranged above the grading layer 20. Top ends of the water penetration tubes 31 may be provided with and covered by a capping form 35 that corresponds to the positions of the tubes and after pouring and shaping of the cement grout 38, the capping form 35 can be removed. The water penetration tubes 31 are each provided in an upper end portion of the tube with a stepped section 312, and is also provided with a retention ring 313 and a slope tenon 314 at locations close to the bottom ends thereof. The upper connection sub-frame 33 and the lower connection sub-frame 34 are each a framework comprising a plurality of hollowed cavities surrounded by a flange section. A plurality of fitting rings 331 is provided on an underside of a plate section of the upper connection sub-frame 33, which serves as the flange section that surrounds circumferences of the hollowed cavities, to receive the stepped section 312 of the water penetration tubes 31 to fit therein. Each of the fitting rings 331 is provided, on a top thereof, with a short tube 332 that is hollowed therethrough to prevent the cement grout 38 to fill into and block the water penetration tubes 31 during a pouring or grouting process. Further, a plurality of plugs 351 that is tightly engageable with an inner circumference of the short tube 332 is provided on an underside of the capping form 35. Further, the lower connection sub-frame 34 comprises annular bodies 341 formed on the flange section and correspond to and distributed along the circumference of each of the hollowed cavities to receive a bottom end portion of the water penetration tube 31 to be received therein and engage with and be retained with the retention ring 313 and the slope tenon 314 so as to prevent sliding or undesired movement during the grouting process of the cement grout 38. Further, the lower connection sub-frame 34 is provided with ribs 342 formed in the hollow cavities thereof for structural strengthening.

The water generation system for improvement of water shortage environments according to the present invention can be alternatively constructed with a combination of the sand layer and the water pervious layer, which are laid from bottom to top, or can also be alternatively constructed with a combination of the grading layer the water pervious layer, which are laid from bottom to top. It is believed all these various modified embodiments fall within the scope of protection of the present invention. In the structure involving only the sand layer or only the grading layer, in combination with the water pervious layer to form the present invention, the sand layer or the grading layer can be provided with a water tank 11 that is embedded therein in advance and the water tank 11 is provided with a plurality of through holes 12 arranged thereon with a sand blocking member, such as a piece of nonwoven fabric 13, being arranged atop and covering each of the through holes 12 in order to block sands and allow rainwater or condensed water to penetrate into the underside water tank 11 for accumulation and storage for subsequent uses.

Figure 2A:
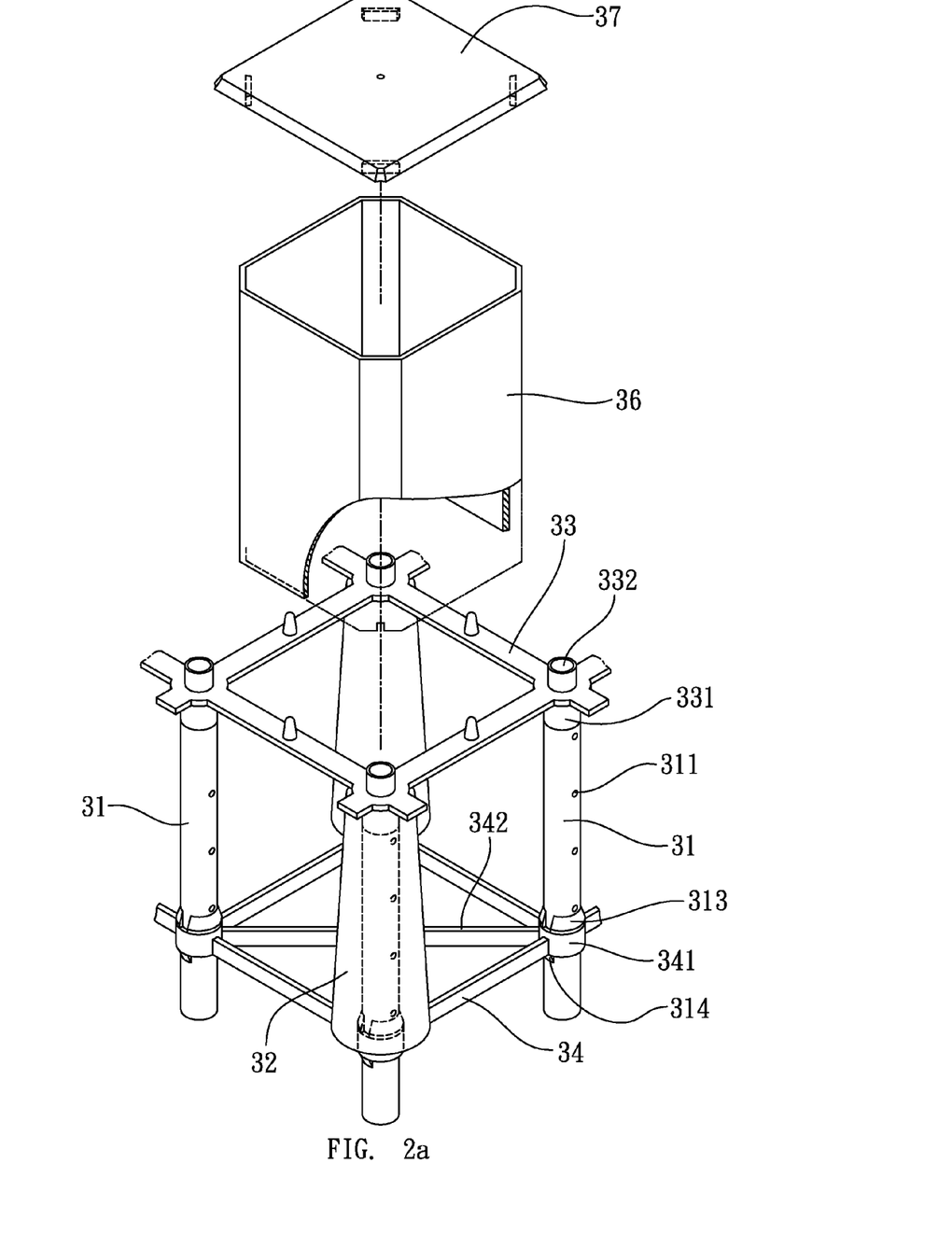
FIG. 2a is a schematic view illustrating the installation of a grass cultivation box in the water pervious layer according to the present invention.
Figure 4:
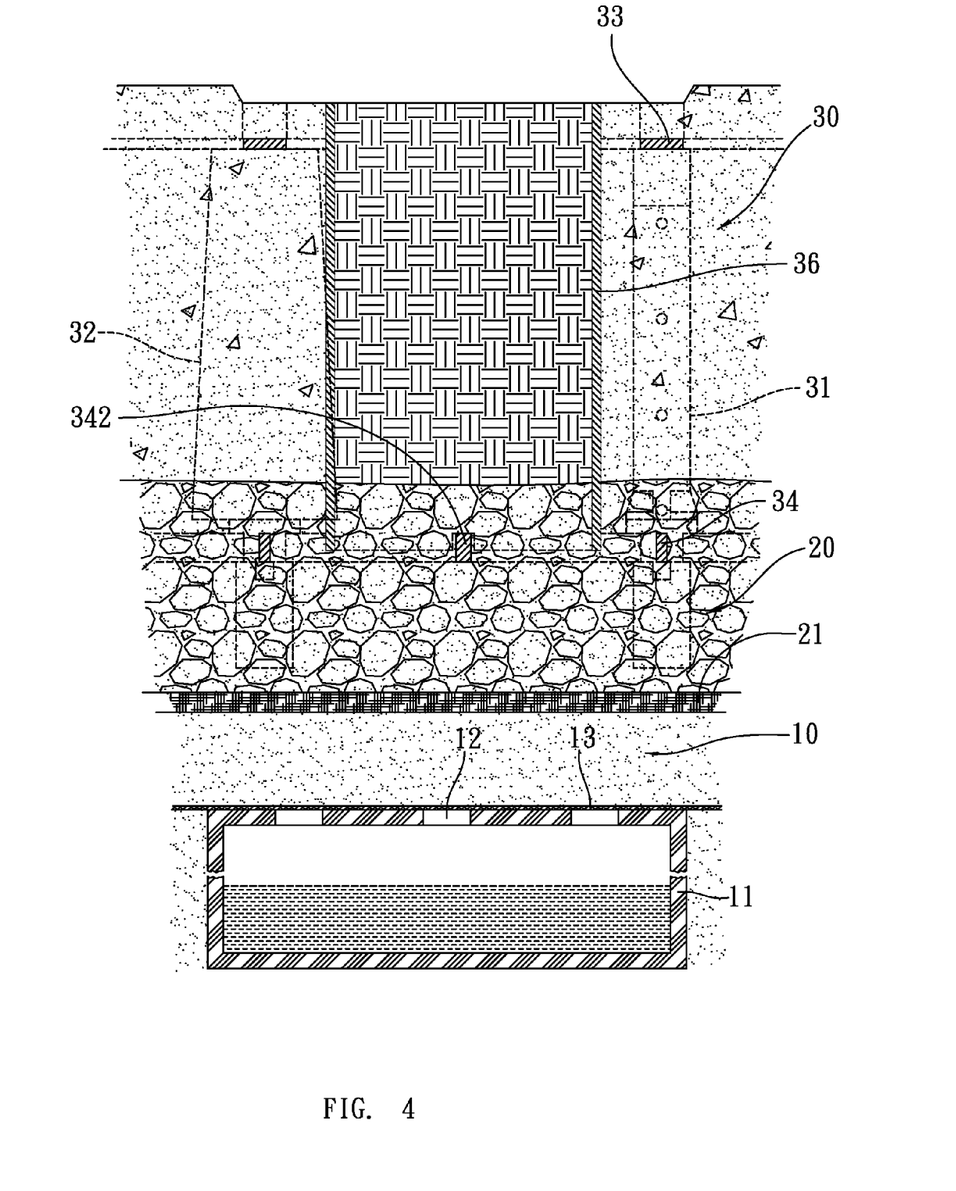
FIG. 4 is a cross-sectional view of a grass cultivation box of the water pervious pavement according to the present invention.
Figure 5:
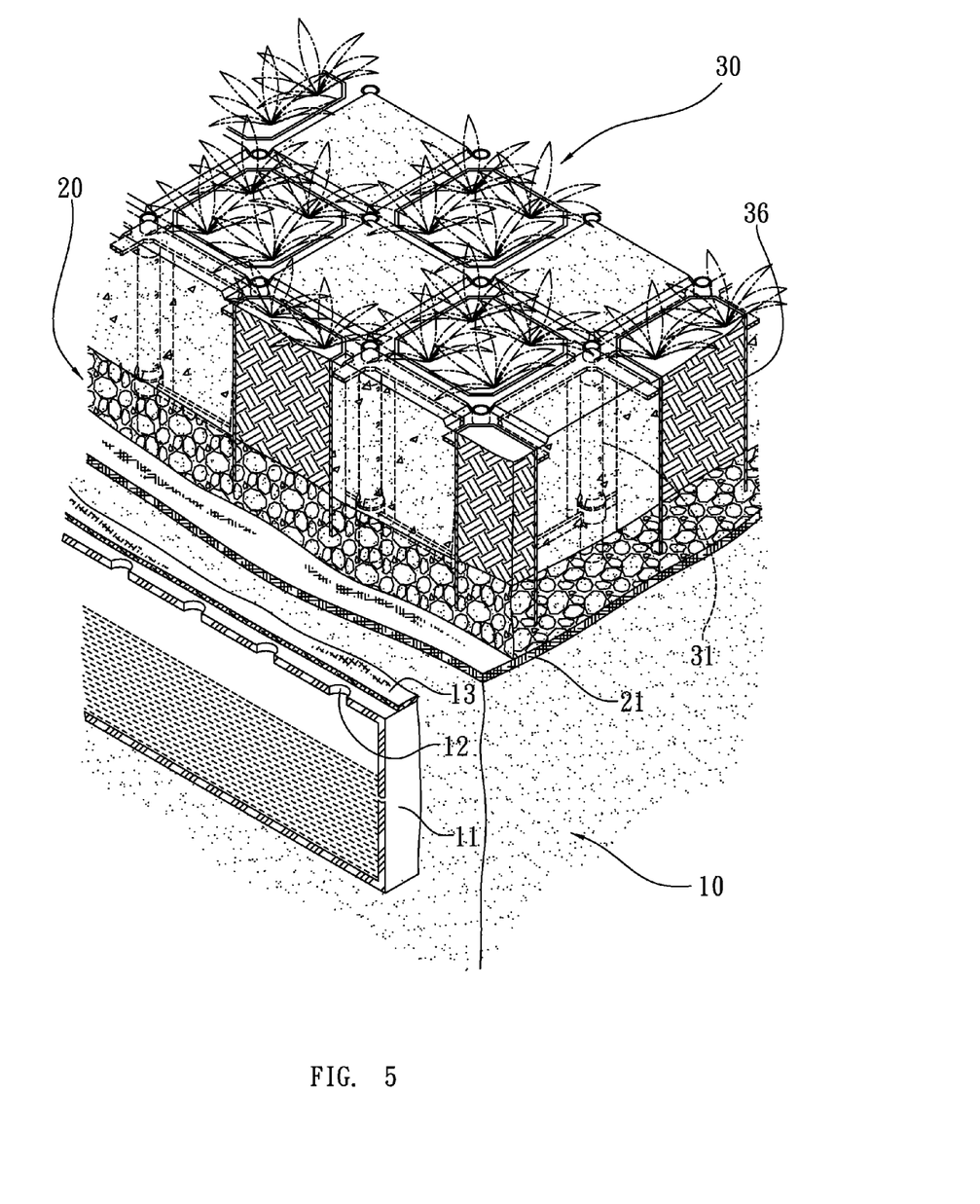
FIG. 5 is a schematic view illustrating an example of application of the water pervious pavement according to the present invention.

Referring to FIGS. 2a, 4, and 5, the present invention may further comprises a hollowed grass cultivation box 36 arranged in the hollowed cavities of the upper connection sub-frame 33 and the lower connection sub-frame 34 and the grass cultivation box 36 is provided atop with a box cover 37 corresponding to and arranged in the capping form 35 so that after grouting and shaping of the cement is completed, the capping form 35 can be removed together with the box cover 37 to expose the grass cultivation box 36 for filling and disposition of soil and earth therein for cultivation of grass for greening purposes. And, then the construction of the water pervious layer 30 is completed. If the size of the grass cultivation box 36 used is small and does not causes interference with treading of human feet or rolling of vehicle wheels, then it may not be necessary to fill soil and earth in the grass cultivation box 36, external dusts may fly into and get deposited in the grass cultivation box to allow plants to naturally grow in the grass cultivation box 36, also reaching an effect of greening.

As such, when the rainfalls on the surface are great and intense, the rainwater can be quickly conducted through the water penetration tubes 31, which serves a surface pavement, into the underside grading layer 20 to further penetrate into the sand layer 10 that is located at a further deeper location to get into the water tank 11 for accumulation and storage for environmentally friendly regeneration and subsequent uses. This provides an effect way of collection of water resources and allowing for fast and efficient draining of surface water, reducing accumulation of water on the surface an also helping supplement underground moisture and water to keep ground and soil wet for helping supply ground fertilization to the plants growing in the grass cultivation box 36.

Further, the water generation system for improvement of water shortage environments according to the present invention uses the weather characteristic of significant temperature difference between daytime and nighttime in a water shortage area such that in the nighttime, the ground surface that has been exposed to sun light and at a high temperature during daytime to generate a temperature difference of an underside temperature below the water pervious pavement structure of the water pervious layer 30 from the temperature of the outside, such as being higher or lower than the surface temperature of the outside, and thus, the water penetration tubes 31 and the through apertures 311 thereof may conduct, naturally, outside air down into the interlayer space A between the water penetration tubes 31 and the sleeve 32 to extract water from the atmosphere through condensation, allowing water to get cool and condense on the tubular wall. This makes the underground wet and keep the soil in the grass cultivation box 36 wet to help the grass to grow better with additional supply of fertilizer there. Further, the condensed water may penetrate into the sand layer 10 and reach the water tank 11 to be accumulated and stored therein for natural supplementary of water into the water tank 11 for reuse, achieving an effect of automatic water generation through condensation. Further, due to the arrangement of the moisture locking cloth 21 between the sand layer 10 and the grading layer 20, the present invention may effectively hold water penetrating into the sand layer 10 to prevent undesired evaporation of such water.

If the present invention is constructed solely with the sand layer 10 in combination with the water pervious layer 30 through being laid from bottom to top, or if the present invention is constructed solely with the grading layer 20 in combination with the water pervious layer 30 through being laid from bottom to top, and the bottoms of the water penetration tubes 31 and the bottoms of the sleeve 32 are both in open forms, a preferred embodiment is such that the bottom ends of the water penetration tubes 31 and the bottom ends of the sleeve 32 are both embedded in the grading layer 20, followed by cement grouting to construct a water pervious layer 30 having water drainage effect. This similarly provides a structure of forming an interlayer space A between the water penetration tubes 31 and the sleeve 32, allowing water to condense on the tubular wall, and thus achieving an effect of water generation without consumption of energy.

Figure 6:
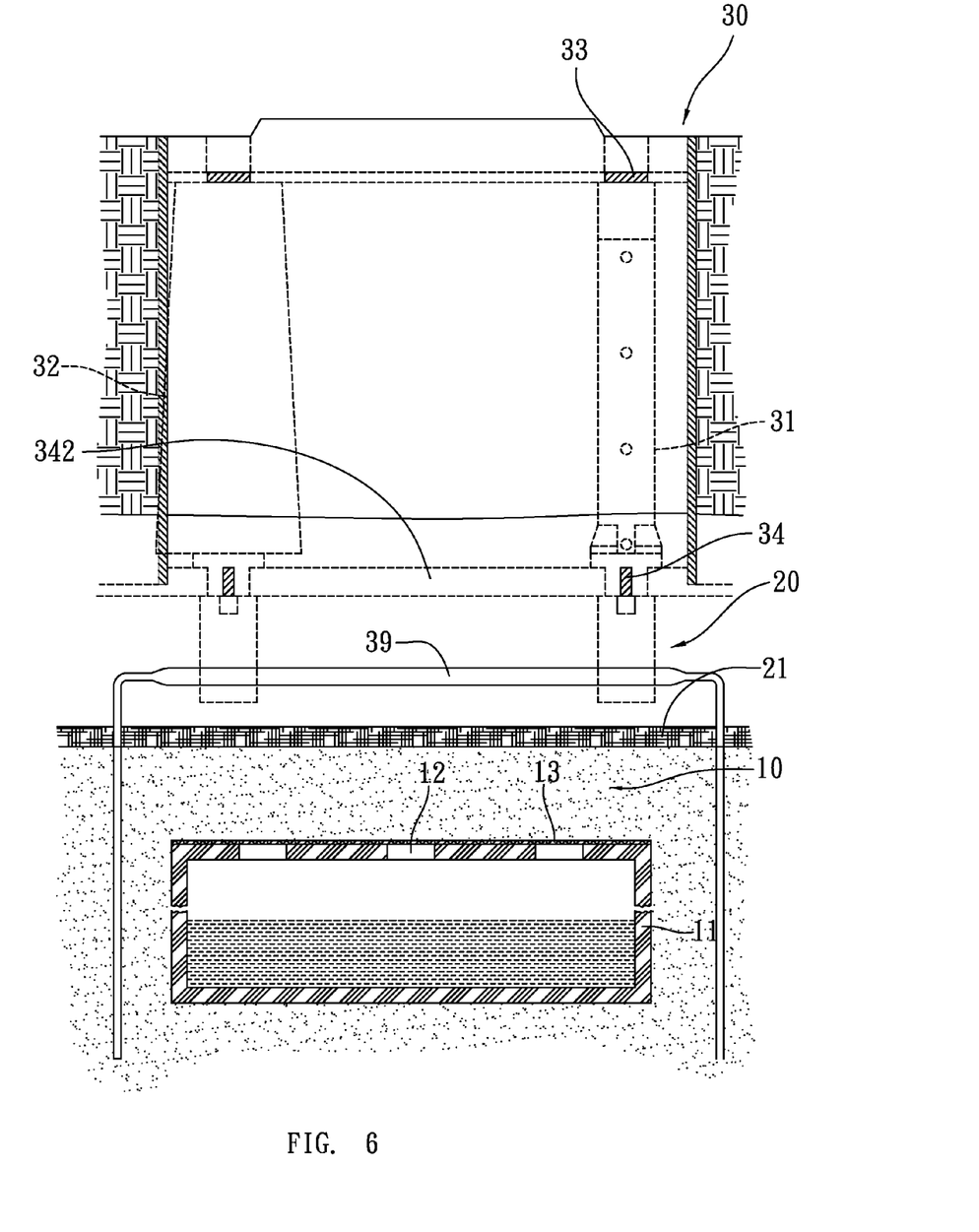
FIG. 6 is a schematic view illustrating an example of application of the present invention in which a heat conduction pipe is additionally provided in an underground soil layer.

As shown in FIG. 6, as shown in the drawing, the present invention may further comprise a heat conduction pipe 39 (also known as heat pipe) at the bottoms of the water penetration tubes 31 and at a location under the sleeves 32 and above the moisture locking cloth 21. The heat conduction pipe is a hollow metal tube comprising a unique material exhibiting a characteristic of fast temperature homogenization so as to show a characteristic of light weight, and the characteristic of fast temperature homogenization is achieved with the performance of superior thermal super conductivity thereof. The heat conduction pipe 39 is arranged in a laid layer at the bottoms of the water penetration tubes 31 and located under the sleeves 32 and above the moisture locking cloth 21 and the laid layer can be solely formed of the sand layer or solely formed of the grading layer with extension legs of the heat conduction pipe 39 extending through the moisture locking cloth 21 and penetrating deeply into the underground soil at a deeper site to achieve an effect of naturally conducting the underground temperature upward to play a role of fast temperature/heat transmission so that in a desert where the atmosphere temperature significantly lowers during the nighttime, the heat conduction pipe 39 may conduct a "relatively high" ground temperature to the underground site to the top, or when the atmosphere temperature of the desert is high and hot during daytime, the heat conduction pipe 39 may conduct a "relatively low" ground temperature to the underground site to the top, whereby temperature difference in the layer at the bottoms of the water penetration tubes 31 and under the sleeves 32 and above the moisture locking cloth 21 is made more significant to achieve more efficient result of water generation through condensation induce by temperature difference.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A water generation system for improvement of water shortage environments, which is formed of an artificial pavement, wherein a laid layer is used in combination with a water pervious layer, laid from bottom to top, the laid layer comprising a sand layer, wherein:
   the sand layer, which comprises a moisture locking cloth for preventing water evaporation and escape;
   the water pervious layer, which comprises a plurality of hollow water penetration tubes arranged above the sand layer and each having an outer circumference over which a tubular sleeve having an opening facing downward is fit such that an interlayer space is formed between the tubular sleeve and the water penetration tube, a bottom of the water penetration tube and a bottom of the tubular sleeve being both in an open form, cement grout being provided around circumferences of the combination of the plurality of water penetration tubes and the tubular sleeves thereof to form a water pervious layer exhibiting an effect of water drainage;
   wherein the plurality of hollow water penetration tubes function to guide surface air into the interlayer spaces of the water pervious layer to allow for water condensation in interlayer tubular walls and thus achieving an effect of automatic water generation;
   wherein the water penetration tubes of the water pervious layer are connected through an upper connection sub-frame and a lower connection sub-frame to form a frame structure that is arranged above the grading layer, the upper connection sub-frame and the lower connection sub-frame being each of a frame comprising a plurality of hollowed cavities, hollowed grass cultivation boxes being disposed in the hollowed cavities.

2. The water generation system for improvement of water shortage environments according to claim 1, wherein the sand layer comprises a water tank embedded therein in advance and the water tank is provided thereon with a plurality of through holes, the through holes being provided atop with and covered by a sand blocking member, allowing rainwater or condensed water to penetrate down to the underside and reach into the water tank to be accumulated therein for subsequent uses.

3. The water generation system for improvement of water shortage environments according to claim 1, wherein a heat conduction pipe is provided at the bottoms of the water penetration tubes and located under the sleeves and above the moisture locking cloth, the heat conduction pipe having extension legs extending through the moisture locking cloth and penetrating into soil at an underside to achieve an effect of guiding, in a natural way, underground temperature to the top.

4. The water generation system for improvement of water shortage environments according to claim 1, wherein the hollow water penetration tubes each comprise a tubular wall in which through apertures are formed.

5. A water generation system for improvement of water shortage environments, which is formed of an artificial pavement, wherein a laid layer is used in combination with a water pervious layer, laid from bottom to top, the laid layer comprising a grading layer, wherein:
   the grading layer, which comprises a moisture locking cloth for preventing water evaporation and escape;
   the water pervious layer, which comprises a plurality of hollow water penetration tubes arranged above the grading layer and each having an outer circumference over which a tubular sleeve having an opening facing downward is fit such that an interlayer space is formed between the tubular sleeve and the water penetration tube, a bottom of the water penetration tube and a bottom of the tubular sleeve being both in an open form, cement grout being provided around circumferences of the combination of the plurality of water penetration tubes and the tubular sleeves thereof to form a water pervious layer exhibiting an effect of water drainage;
   wherein the plurality of hollow water penetration tubes function to guide surface air into the interlayer spaces of the water pervious layer to allow for water condensation in interlayer tubular walls and thus achieving an effect of automatic water generation;
   wherein the water penetration tubes of the water pervious layer are connected through an upper connection sub-frame and a lower connection sub-frame to form a frame structure that is arranged above the grading layer, the upper connection sub-frame and the lower connection sub-frame being each of a frame comprising a plurality of hollowed cavities, hollowed grass cultivation boxes being disposed in the hollowed cavities.

6. The water generation system for improvement of water shortage environments according to claim 5, wherein the grading layer comprises a water tank embedded therein in advance and the water tank is provided thereon with a plurality of through holes, the through holes being provided atop with and covered by a sand blocking member, allowing rainwater or condensed water to penetrate down to the underside and reach into the water tank to be accumulated therein for subsequent uses.

7. The water generation system for improvement of water shortage environments according to claim 5, wherein a heat conduction pipe is provided at the bottoms of the water penetration tubes and located under the sleeves and above the moisture locking cloth, the heat conduction pipe having extension legs extending through the moisture locking cloth and penetrating into soil at an underside to achieve an effect of guiding, in a natural way, underground temperature to the top.

8. The water generation system for improvement of water shortage environments according to claim 5, wherein the hollow water penetration tubes each comprise a tubular wall in which through apertures are formed.

9. A water generation system for improvement of water shortage environments, which is formed of an artificial pavement, wherein a laid layer is used in combination with a water pervious layer, laid from bottom to top, the laid layer comprising a sand layer and a grading layer, wherein:
   the sand layer being covered with a moisture locking cloth for preventing water evaporation and escape;
   the grading layer being laid on the sand layer;
   the water pervious layer, the water pervious layer comprising a plurality of hollow water penetration tubes arranged above the grading layer and each having an outer circumference over which a tubular sleeve having an opening facing downward is fit such that an interlayer space is formed between the tubular sleeve and the water penetration tube, a bottom of the water penetration tube and a bottom of the tubular sleeve being both in an open form, cement grout being provided around circumferences of the combination of the plurality of water penetration tubes and the tubular sleeves thereof to form a water pervious layer exhibiting an effect of water drainage;

wherein the plurality of hollow water penetration tubes function to guide surface air into the interlayer spaces of the water pervious layer to allow for water condensation in interlayer tubular walls and thus achieving an effect of automatic water generation;

wherein the water penetration tubes of the water pervious layer are connected through an upper connection sub-frame and a lower connection sub-frame to form a frame structure that is arranged above the grading layer, the upper connection sub-frame and the lower connection sub-frame being each of a frame comprising a plurality of hollowed cavities, hollowed grass cultivation boxes being disposed in the hollowed cavities.

10. The water generation system for improvement of water shortage environments according to claim 9, wherein the sand layer comprises a water tank embedded therein in advance and the water tank is provided thereon with a plurality of through holes, the through holes being provided atop with and covered by a sand blocking member, allowing rainwater or condensed water to penetrate down to the underside and reach into the water tank to be accumulated therein for subsequent uses.

11. The water generation system for improvement of water shortage environments according to claim 9, wherein a heat conduction pipe is provided at the bottoms of the water penetration tubes and located under the sleeves and above the moisture locking cloth, the heat conduction pipe having extension legs extending through the moisture locking cloth and penetrating into soil at an underside to achieve an effect of guiding, in a natural way, underground temperature to the top.

12. The water generation system for improvement of water shortage environments according to claim 9, wherein the hollow water penetration tubes each comprise a tubular wall in which through apertures are formed.

* * * * *